Nov. 25, 1924.                                                    1,516,714
A. D. COLE
REIN CONTROLLED STEERING AND GEAR SHIFTING ATTACHMENT FOR TRACTORS
Filed Feb. 14, 1921
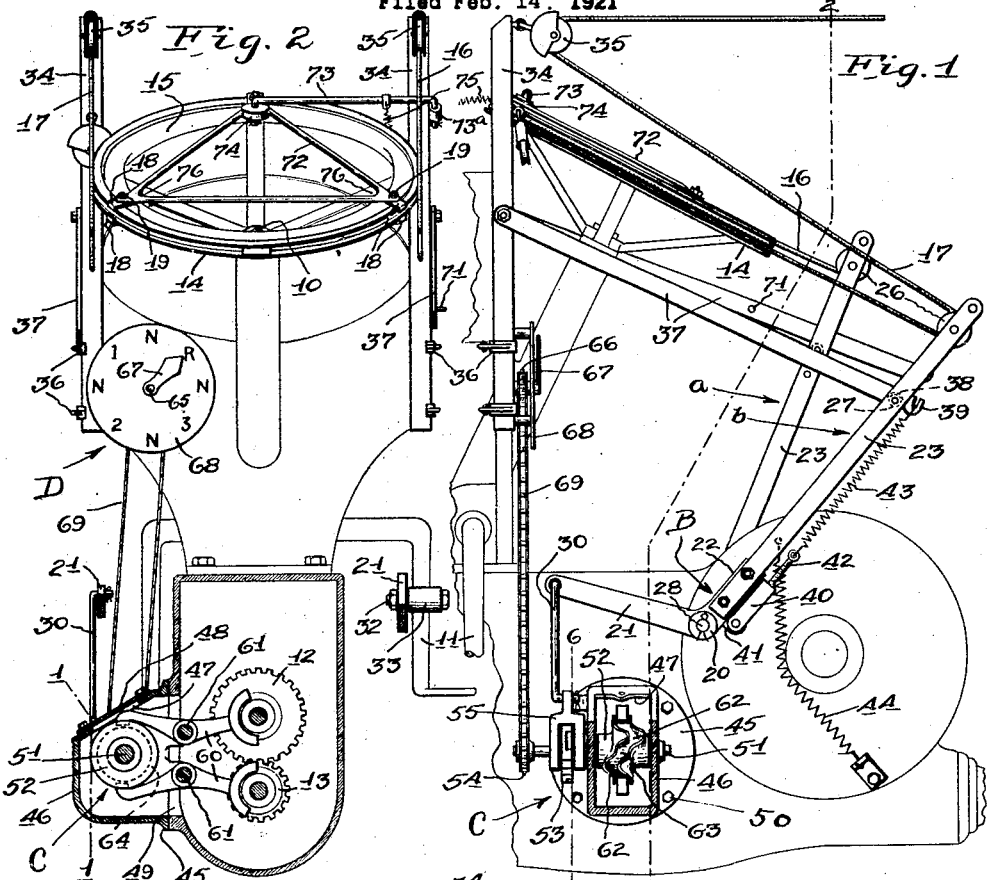
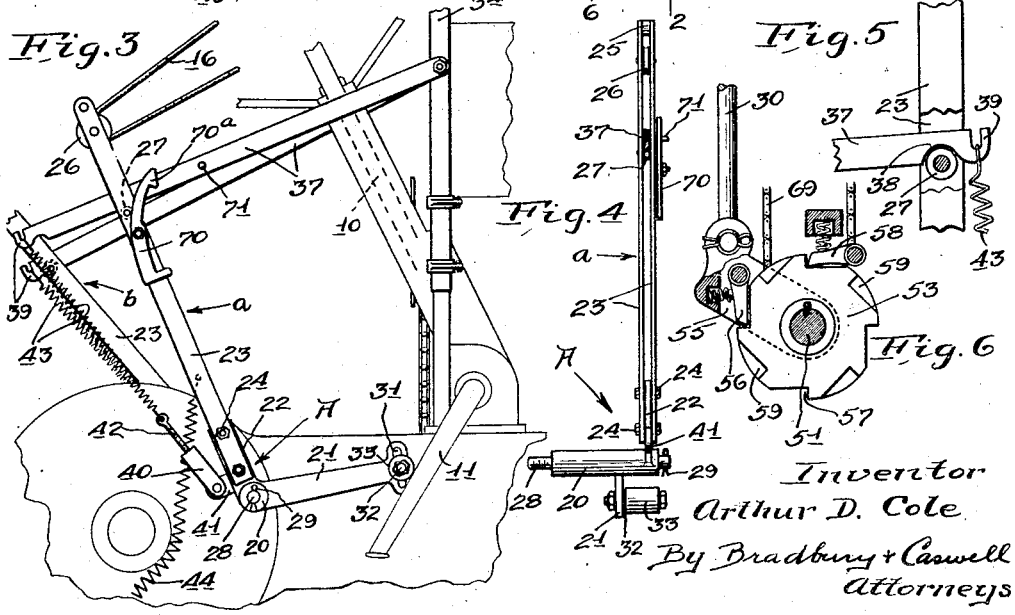
Inventor
Arthur D. Cole
By Bradbury + Caswell
Attorneys Patented Nov. 25, 1924.

1,516,714

UNITED STATES PATENT OFFICE.

ARTHUR DENNIS COLE, OF MINNEAPOLIS, MINNESOTA.

REIN-CONTROLLED STEERING AND GEAR-SHIFTING ATTACHMENT FOR TRACTORS.

Application filed February 14, 1921. Serial No. 444,659.

*To all whom it may concern:*

Be it known that I, ARTHUR DENNIS COLE, a citizen of the United States, residing in Minneapolis, in the county of Hennepin and State of Minnesota, have invented a new and useful Rein-Controlled Steering and Gear-Shifting Attachment for Tractors, of which the following is a specification.

My invention relates to improvements in tractor controlling attachments.

Its object is to provide a device of this nature, which is simple, durable and inexpensive in construction and designed to be readily applied to or removed from a tractor structure.

A further object is to provide a device of this character embodying a pair of reins and associated shifter members employed in conjunction with a tractor steering mechanism, whereby an operator, in various positions at the rear of the tractor, may steer the same, operate the tractor clutch and change the relation of the tractor driving gears.

With the foregoing and other objects in view, which will appear in the following description, the invention resides in the novel combination and arrangement of parts and in the details of construction hereinafter described and claimed.

In the drawings, Fig. 1 illustrates, in elevation, a portion of a tractor, together with a device embodying my invention applied thereto, a portion of said device being broken away, as on the line 1—1 of Fig. 2, to disclose certain parts which would otherwise be concealed; Fig. 2 is a sectional view taken on the line 2—2 of Fig. 1; Fig. 3 is a fragmentary view similar to Fig. 1, but showing the reverse side of the tractor structure and control mechanism illustrated therein; Fig. 4 is a rear view in detail, illustrating the clutch actuating shifter member; Fig. 5 is a view in elevation, illustrating, in detail, the end of a yielding locking bar for one of the shifter members, and Fig. 6 is an enlarged detail view, partly in section, taken on the line 6—6 of Fig. 1.

It will be understood that the types of tractors to which my improved control device is preferably applicable, embody the usual steering post 10, clutch throw-out lever 11 and transmission gears, such as 12 and 13, shiftable by means of ordinary shifting forks.

My improvement includes a drum 14, or other turning device, said drum being preferably arranged to turn the steering post 10 of a tractor by applying the same to the usual steering wheel 15 on said post. The invention also includes two shifter members A and B, each member being respectively actuated by reins or lines 16 and 17, said reins being wound upon the drum 14 and capable of turning the steering post 10 in opposite directions. The relation of the tractor gears is changed through gear shifting mechanism C, actuated by the shifter member B, while the clutch lever 11 of the tractor is actuated by the shifter member A.

The drum 14 is channel-shaped in cross section to provide upper and lower flanges for retaining the turns of the reins 16 and 17 thereon. This drum is attached to the steering wheel 10 by means of grips comprising opposed jaws 18 (Fig. 2) clamped firmly against the drum and rim of the steering wheel, as by means of bolts 19. The shifter members A and B are substantially the same in form, each including a bell crank consisting of a sleeve 20 with arms 21 and 22 thereon. Levers *a* and *b* on said upwardly extending arms 22 each include a pair of spaced bars 23, said bars being secured at their lower ends upon opposite sides of said arms 22 by bolts 24, the upper ends of the bars being separated by means of spacing blocks 25. Near the upper end of each of said levers *a* and *b* is a sheave 26 journaled between the bars 23. Slightly beneath each sheave is a roller 27 also journaled between said bars. A stud 28 for each of the shifter members A and B is adapted to be threaded into the frame of the tractor structure and to tiltably receive the sleeve 20 of its respective shifter member. These sleeves are secured against removal from the studs 28 by pins 29 passing through the ends of said studs. The arm 21 of the shifter member B carries a depending link 30 for actuating the gear shifter mechanism C, as will hereinafter appear, while the corresponding arm 21 of the shifter member A is slotted, as at 31, to adjustably receive a journal 32 upon which a roller 33 is mounted. This roller rests within the path of the clutch operating arm 11 of the tractor and serves to depress said arm or release the same following the usual manner of an operator in releasing and engaging the clutch mechanism of the tractor. Upright frame members 34 are detachably secured to the tractor structure, preferably by means of removable clamps 36. At the upper extremity of each frame member 34, I attach a swiveled pulley 35. The reins 16 and 17, attached to and wound upon the drum 14 in opposite directions, pass rearwardly from the drum, the rein 16 being directed around the sheave 26 on the lever *a*, thence over the pulley 35 on the right frame member 34 and thence to the rear of the tractor, while the rein 17 is passed around the sheave 26 on the lever *b*, thence over the pulley 35 on the left frame member 34 and thence to the rear of the tractor. Latch bars 37, pivoted on the right and left frame members 34, extend rearwardly between the bars 23 of their respective shifter members A and B and above the rollers 27, between said bars 23. Each latch bar 37 is formed at its free end with a roller receiving depression 38 and a hook 39. An inverted U-shaped link 40, pivoted at its lower ends on a lug 41 on the upright arm 22 of each shifter member, is threaded at its upper end to adjustably receive an eye-bolt 42. A spring 43 for each shifter member is stretched between the eye-bolt 42 and the hook 39 on the latch bar 37 thereof. These springs 43 serve to engage the roller receiving depressions 38 in the latch bars 37 with the rollers 27 and operate to yieldingly hold the levers *a* and *b* in retracted normal positions. The self-engaging action of the usual tractor clutch mechanism tends to return the shifter member A to normal position, but I prefer not to depend wholly upon this action of the clutch mechanism in returning said shifter member. Means for retracting the member A is supplied, said means being duplicated for similarly retracting the shifter member B. Rearwardly pulling springs 44 are interposed between the levers *a* and *b* and the tractor structure, the connections between said springs and tractor structure being adjustable to vary the tension of said springs.

Turning now to the gear shifting mechanism C, above mentioned, it will be noted that said mechanism includes a plate 45 having a housing 46 formed thereon, said housing having an opening 47 at the upper side thereof, which is normally closed by a removable cover 48. Said plate 45 is substituted for the usual gear shifter plate and is secured in position covering the usual opening 49 in the side of the transmission housing by means of the original machine bolts 50. A shaft 51 is journaled transversely in the housing 46, a cam 52 being secured on said shaft within said housing and a ratchet wheel 53 and sprocket wheel 54 being fixed to said shaft 51 outside of the housing. A rocker arm 55, pivoted on said shaft 51, carries a spring pressed pawl 56 adapted to engage only in four equally spaced notches 57 cut through the entire width of the sprocket wheel 53. A spring pressed pawl 58, pivoted on the housing 46, is adapted to prevent backward rotation (clockwise movement, Fig. 6) of the ratchet wheel 53, by engaging not only in said wide notches 57, but also in four equally spaced narrow notches 59, formed in said ratchet wheel midway between said wide notches 57. The rocker arm 55 is connected with the lower end of the link 30 and is oscillated by said link when the shifter member B is rocked backward and forward. Upper and lower gear shifters 60, applied at their inner ends in the usual manner to the sliding gears of the tractor transmission mechanism, are slidably mounted on rods 61 carried by the plate 45, the outer ends of each of said gear shifters being turned toward each other. The cam 52 is provided with a way in the periphery thereof, which receives said turned ends of the shifters 60 in diametrically opposed positions. This way has opposed shifting sections 62 (Fig. 1) formed in adjacent quarters on one side of the cam and separated by a short neutral section 63, which corresponds with a semi-circular neutral section 64 on the opposite side of said cam. Thus, it will be seen that during one-eighth of a revolution of said cam, one of said gear shifters 60 is moved from neutral position to one extreme, or from one extreme back to neutral position, while the other gear shifter remains in neutral position. The camway being so shaped, shifts the transmission mechanism progressively through the low, intermediate, high and reverse gears in the usual manner and insures the neutral positioning thereof preparatory to each change. An indicator D, showing the relation of the transmission gears, includes a pointer shaft 65 revolubly mounted in an extension (not shown) of the left frame member 34. Said shaft 65 is fitted with a sprocket wheel 66 and a pointer 67, the latter being designed to turn in front of a dial 68, also mounted on said extension. The sprocket 66 on the dial shaft 65 and the sprocket 54 on the cam shaft 51 are identical and are connected by a sprocket chain 69. The dial 68 has four equally spaced symbols designating first, second and third speeds and reverse, all corresponding respectively with the four gear meshing positions of the cam 52, as acquired in tilting the shifter member B forward and backward four successive times. When the tractor is in first speed, a pull upon the lever *b* first results in turning the cam 52 one-eighth of a revolution, whereupon the transmission gears are shifted to neutral position. Continued forward movement of the lever *b* completes the quarter turn of the cam 52, thus causing the meshing of the gears, wherein the next or second speed is attained.

Midway between each gear symbol on the dial 68 is a neutral sign designating to the driver the instances in which the transmission gears are in neutral relation. As above stated, the locking pawl 58 engages both sets of notches 57 and 59 in the ratchet wheel 53. By this arrangement, the ratchet wheel 53 is locked against reverse movement upon each turn of forty-five degrees and secures the cam 52 in neutral positions, as in gear meshing positions, when the lever b is retracted after a partial forward throw thereof.

At times it is desirable to release the reins and at the same time disengage the clutch mechanism of the tractor. Without further provision than that heretofore described, this would be impossible, since the lever a would be automatically returned to normal position upon the slackening of the rein 16. I pivot a latch 70 upon the lever a, said latch being weighted at its lower end and held so that the head 70ª thereof will engage a pin 71 in the companion bar 37 and swing the latch 70 sufficiently to carry the head 70ª over said pin and catch the same at the extreme forward throw of the lever a. This latch 70 is released from said pin 71 by a short pull upon the rein 16 followed by immediately slackening said rein. During the short pull, the head 70ª of the latch is swung from the pin 71 and held from engagement therewith by the momentum of the weighted end of said latch sufficiently long to permit the retraction of the lever a beyond latch engaging position.

I supply means for yieldingly securing the tractor guiding mechanism, whereby given directions of the tractor steering wheels may be maintained. A track 72, preferably triangular in form, is secured at its corners upon the steering wheel 15 by the bolts 19, which clamp the drum 14 upon said wheel. An arm 73, pivoted upon one of the frame members 34 and adapted to swing in the plane of the steering wheel, is supplied at its free end with a grooved follower wheel 74. A spring 75, stretched between said arm 73 and a point forward upon the tractor structure, yieldingly holds said follower wheel 74 in contact with the track 72. In ordinary adjustment, one angle or holding turn 76 of the track 72 is arranged so that the tractor is directed straight ahead, when the follower wheel 74 rests in holding position therein (Fig. 2). The remaining angles or turns may be arranged in such relation as desired. The reaches of the track 72, between the holding turns, always lie in angular relation with respect to the sweep of the follower wheel so that the action of the spring 75 tends to turn the steering wheel 15 in a direction to carry the nearest angle 76 into forward holding position of said follower wheel 74. It will, therefore, be seen that the follower wheel 74, in a given angle of the track 72, will yieldingly hold the steering wheel 15 in position maintaining said relation of follower wheel 74 and track 72. With the foregoing, it will be understood that the arm 73 may swing back and forth to compensate for shifting movements of the steering gear under unequalities in the road surface and that said arm will yield when the steering wheel 15 is turned in either direction by the reins 16 and 17. In plowing and for other purposes, it is sometimes desirable to direct the guiding wheels of a tractor so that one of them will bear toward the land side of a furrow. My track 72 may be easily shifted on the steering wheel 15 to produce such inclination of the tractor wheels. In lieu of shifting the track 72 on the steering wheel 15 for the purpose just mentioned, the reach of the arm 73 may be altered. The pivotal mounting for this arm comprises an eye 73ª adapted to receive the downturned end of the arm 73, said eye being offset upon a shank, which is secured by bolts, not shown, to the left frame member 34. Reversing this eye results in lengthening or shortening the reach of the arm 73, thus producing certain adjustments, accomplished by shifting the track 72 on the wheel 15.

A rein guard, not shown, may be attached to the frame member 34 to aid in holding the reins 16 and 17 within the channel of the drum 14.

In operation, the user holds the reins 16 and 17 as in driving. He may be at any position, as on an implement drawn by the tractor, or elsewhere. Assuming that the transmission of the tractor is in neutral and it is desired to proceed, the operator pulls upon both reins 16 and 17 in the order named, to disengage the clutch mechanism of the tractor and throw the transmission into gear, and follows by slackening both reins to re-engage the clutch mechanism and permit the return of the lever b. The tractor then moves according to the gear ratio obtained by the gear shifting mechanism C. Changes in the gear ratio and back to neutral are obtained in the transmission by subsequent pulls upon the reins 16 and 17.

In travel, the tractor is turned to the right by simultaneously pulling upon the rein 16 and slackening the rein 17, while a turn to the left is made by pulling upon the rein 17 and slackening the rein 16. The resistance of the shifter members A and B against displacement from normal retracted positions is sufficiently great to provide for the turning of the steering wheel 15 by a pull upon one rein without disturbing the normal position of its companion shifter member, when the other rein is slackened. This resistance of one shifter member against forward movement is substantially equal to that of the other member and said resistance of either member, coupled with resistance against movement in the steering mechanism, results in the displacement of one member from normal position by a pull upon its respective rein, while the other rein is held with little effort, to maintain the direction of travel.

It will thus be seen that with my improved attachment, a user may operate a tractor with only two reins or lines, the direction of travel, speed through transmission changes and clutch positions being constantly under control.

Changes in the specific form of my invention, as herein disclosed, may be made within the scope of what is claimed without departing from the spirit of my invention.

Having described my invention, what I claim as new and desire to secure by Letters Patent is:

1. The combination with a tractor having guiding mechanism including a revoluble element, of a rein controlled attachment therefor comprising means for shifting the tractor gears, means for operating the tractor clutch, and a pair of reins for reversely turning the revoluble element, one rein being connected with and adapted upon a pull thereon to actuate the gear shifting means, the second rein being connected with and adapted upon a pull thereon to actuate the clutch operating means, each rein serving to hold the revoluble element against undesired rotation during a pull upon the other rein.

2. The combination with a tractor having guiding mechanism including a revoluble element, of an attachment therefor comprising a gear shifter member, a clutch operating member and a pair of reins, both reins being connected with the revoluble element for turning the same, one of said reins having a sliding operable connection with said gear shifter member and the other having a sliding operable connection with the clutch operating member.

3. The combination with a tractor having guiding mechanism, of an attachment therefor comprising a turning device for operating said mechanism, a gear shifter member, a clutch shifter member, and a pair of reins attached to said turning device for swinging the same in opposite directions, one of said reins having an operative connection with the gear shifter member between the turning device and the free end of the rein, the other rein having an operative connection with the clutch shifter member between said turning device and the free end of said rein, each rein serving as a holding medium for retaining the said turning device against rotation when a pull is made upon the other rein to actuate its respective shifter member.

4. The combination with a tractor having guiding mechanism, of a turning device for operating said mechanism, a gear shifter member, a clutch shifter member, a pair of reins attached to said turning device for swinging the same in opposite directions, one of said reins having an operative connection with the gear shifter member between the turning device and the free end of the rein, the other rein having an operative connection with the clutch shifter member between said turning device and the free end of said rein, each rein serving as a holding medium to secure the turning device against rotation when a pull is made upon the other rein to actuate its respective shifter member, yielding means for retracting the shifter members, said yielding means affording sufficient resistance, whereby a pull on one line will only result in moving the turning device unless the second line is held against said first line.

5. The combination with a tractor having guiding mechanism, of a turning device for operating said mechanism, a gear shifter member, a clutch shifter member, a pair of reins attached to said turning device for swinging the same in opposite directions, one of said reins having an operative connection with the gear shifter member between the turning device and the free end of the rein, the other rein having an operative connection with the clutch shifter member between said turning device and the free end of said rein, each rein serving as a holding medium to secure the turning device against rotation when a pull is made upon the other rein to actuate its respective shifter member, yielding means for retracting the shifter members and yielding latching means for releasably securing said shifter members in retracted positions, said yielding, retracting and latching means together affording sufficient resistance, whereby a pull on one line will only result in moving the turning device unless the second line is held against said first line.

6. The combination with a tractor having guiding mechanism, of a turning device for operating said mechanism, a gear shifter member, yielding means for retracting said member, a clutch shifter member, yielding means for retracting the same, and a pair of reins attached to said turning device for swinging the same in opposite directions, one of said reins having an operative connection with the gear shifter member between said turning device and the free end of said rein, the other rein having an operative connection with the clutch shifter member between said turning device and the free end of said rein, each rein serving as a holding medium for the other to retain the turning device against rotation when a pull is made upon one or the other of said reins to actuate its respective shifter member against the action of said yielding means, the resistance of said yielding means being sufficiently great to permit the swinging of the turning device by pulls upon either rein without disturbing the normal positions of said members.

7. The combination with a tractor having guiding mechanism, of a turning device for operating said mechanism, a gear shifter member, a clutch shifter member, a pair of reins attached to said turning device for swinging the same in opposite directions, one of said reins having a bight in slidable, operable connection with the gear shifter member, the other rein having a bight in slidable, operable connection with the clutch shifter member, each rein serving as a holding medium for the other to retain the turning device against rotation when a pull is made upon one or the other of said reins to actuate its respective shifter member and yielding means for retracting the shifter members, the resistance afforded by said yielding means against the movement of said members by said reins being substantially equal, said guiding mechanism lending sufficient resistance to that of either shifter member, whereby one member may be actuated by a pull upon its respective rein without disturbing the positions of the turning device and the other member.

8. The combination with a tractor having guiding mechanism, of a turning device for operating said mechanism, a gear shifter member, a clutch shifter member, a pair of reins attached to said turning device for swinging the same in opposite directions, one of said reins having a bight in slidable, operable connection with the gear shifter member, the other rein having a bight in slidable, operable connection with the clutch shifter member, each rein serving as a holding medium for the other to retain the turning device against rotation when a pull is made upon one or the other of said reins to actuate its respective shifter member and independent yielding means for retracting each shifter member, a yielding latch for releasably securing each of said members in normal retracted position, the resistance afforded by said yielding means and latches against the movement of said members by said reins being substantially equal, said guiding mechanism lending sufficient resistance to that of either shifter member, whereby one member may be actuated by a pull upon its respective rein without disturbing the positions of the turning device and the other member.

9. The combination with a tractor having guiding mechanism therefor, of a turning device for operating said mechanism, means for rotating said device in reverse directions, a track secured to said turning device, said track having converging reaches forming holding turns in the angles thereof, a yielding follower engaging said track and adapted, when in the holding turns thereof, to yieldingly secure said device and, when removed from a holding turn, to operate against a reach of the track and thereby yieldingly urge said turning device into position permitting the return of said follower to one of said holding turns.

10. The combination with a tractor having guiding mechanism therefor, of a turning device for operating said mechanism, means for rotating said device in reverse directions, an adjustable track adapted to be secured to said turning device in various angular positions with respect to the axis thereof, said track having converging reaches forming a holding turn in the angle thereof, a yielding follower engaging said track and adapted, when in the holding turn thereof, to yieldingly secure said device.

11. The combination with a tractor having guiding mechanism therefor, of a turning device for operating said mechanism, means for rotating said device in reverse directions, a track secured to said turning device, said track having converging reaches forming a holding turn in the angle thereof, a yielding follower engaging said track and adapted, when in the holding turn thereof, to yieldingly secure said device.

12. The combination with a tractor having guiding mechanism and variable speed gears, of an attachment therefor comprising a turning device for operating said mechanism, a gear shifter member in operative connection with said gears, an indicator actuated by said shifter member to designate the relation of said gears, yielding means for retracting said member, a first and second rein, both attached to the turning device for swinging the same in reverse directions, said first rein having an operative connection with the shifter member and adapted to actuate said member against the action of said yielding means, said turning device being capable of being secured against rotation by holding the second rein when the first rein is pulled to actuate the shifter member and said yielding means operating upon the shifter member with sufficient strength to secure it in retracted position when the turning device is swung by a pull upon the first rein accompanied by the slackening of the second rein.

13. The combination with a tractor having guiding mechanism and variable speed gears, of an attachment therefor comprising a turning device for operating said mechanism, a gear shifter member in operative connection with said gears, yielding means for retracting said member, a yielding latch for releasably securing said shifter member in retracted position, a first and second rein, both attached to the turning device for swinging the same in reverse directions, said first rein having an operative connection with the shifter member and adapted to actuate said member against the action of said yielding means, said turning device being capable of being secured against rotation by holding the second rein when the first rein is pulled to actuate the shifter member and said yielding means and latch operating upon the shifter member with sufficient strength to secure it in retracted position when the turning device is swung by a pull upon the first rein accompanied by the slackening of the second rein.

14. The combination with a tractor having guiding mechanism and variable speed gears, of an attachment therefor comprising a turning device for operating said mechanism, a gear shifter member in operative connection with said gears, yielding means for retracting said member, a first and second rein, both attached to the turning device for swinging the same in reverse directions, said first rein having an operative connection with the shifter member and adapted to actuate said member against the action of said yielding means, said turning device being capable of being secured against rotation by holding the second rein when the first rein is pulled to actuate the shifter member and said yielding means operating upon the shifter member with sufficient strength to secure it in retracted position when the turning device is swung by a pull upon the first rein accompanied by the slackening of the second rein.

15. The combination with a tractor having guiding mechanism and clutch operating means, of an attachment therefor comprising a turning device for operating said mechanism, a shifter member for actuating said clutch operating means, yielding means for retracting said member, a yielding latch for releasably securing said shifter member in retracted position, a first and second rein, both attached to the turning device for swinging the same in reverse directions, said first rein having an operative connection with the shifter member and adapted to actuate said member against the action of said yielding means, said turning device being capable of being secured against rotation by holding the second rein when the first rein is pulled to actuate the shifter member and said yielding means and latch operating upon the shifter member with sufficient strength to secure it in retracted position when the turning device is swung by a pull upon the first rein accompanied by the slackening of the second rein.

16. The combination with a tractor having guiding mechanism and clutch operating means, of an attachment therefor comprising a turning device for operating said mechanism, a shifter member for actuating said clutch operating means, yielding means for retracting said member, a first and second rein, both attached to the turning device for swinging the same in reverse directions, said first rein having an operative connection with the shifter member and adapted to actuate said member against the action of said yielding means, said turning device being capable of being secured against rotation by holding the second rein when the first rein is pulled to actuate the shifter member and a self releasing catch for securing the shifter member in relation opposed to retracted position, said yielding means operating upon the shifter member with sufficient strength to secure it in retracted position when the turning device is swung by a pull upon the first rein accompanied by the slackening of the second rein.

17. The combination with a tractor having guiding mechanism and clutch operating means, of an attachment therefor comprising a turning device for operating said mechanism, a shifter member for actuating said clutch operating means, yielding means for retracting said member, a first and second rein, both attached to the turning device for swinging the same in reverse directions, said first rein having an operative connection with the shifter member and adapted to actuate said member against the action of said yielding means, said turning device being capable of being secured against rotation by holding the second rein when the first rein is pulled to actuate the shifter member and said yielding means operating upon the shifter member with sufficient strength to secure it in retracted position when the turning device is swung by a pull upon the first rein accompanied by the slackening of the second rein.

18. The combination with a tractor having guiding mechanism therefor including a revoluble element, means for turning said element to steer the tractor, a track fixed with respect to the revoluble element and formed with a holding turn therein, a yielding follower engaging said track and adapted to urge the revoluble element into selected position, wherein the follower may rest in said holding turn and thus yieldingly hold said element.

19. The combination with a tractor having guiding mechanism therefor including a wheel, means for turning the wheel to steer the tractor, a track adjustably secured with respect to said wheel and formed with a holding turn therein, a yielding follower engaging said track and adapted to urge the wheel into selected position, wherein the follower may rest in said holding turn and thus yieldingly hold said wheel.

In testimony whereof, I have signed my name to this specification.

ARTHUR DENNIS COLE.